US012597859B2

(12) United States Patent
Tsuruta

(10) Patent No.: US 12,597,859 B2
(45) Date of Patent: Apr. 7, 2026

(54) POWER CONVERSION DEVICE

(71) Applicant: Mitsubishi Electric Corporation, Tokyo (JP)

(72) Inventor: Ryoji Tsuruta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 119 days.

(21) Appl. No.: 18/291,658

(22) PCT Filed: Aug. 5, 2021

(86) PCT No.: PCT/JP2021/029063
§ 371 (c)(1),
(2) Date: Jan. 24, 2024

(87) PCT Pub. No.: WO2023/012963
PCT Pub. Date: Feb. 9, 2023

(65) Prior Publication Data
US 2024/0356440 A1 Oct. 24, 2024

(51) Int. Cl.
*H02M 3/158* (2006.01)
*H02M 1/00* (2006.01)
(Continued)

(52) U.S. Cl.
CPC .......... *H02M 3/158* (2013.01); *H02M 1/007* (2021.05); *H02M 1/123* (2021.05); *H02M 7/219* (2013.01)

(58) Field of Classification Search
CPC ...... H02M 3/158; H02M 1/007; H02M 1/123; H02M 7/219; H02M 1/42; H02M 1/4208;
(Continued)

(56) References Cited

U.S. PATENT DOCUMENTS

| | | | |
|---|---|---|---|
| 9,590,494 B1* | 3/2017 | Zhou ................... | H02M 1/4233 |
| 2011/0170322 A1* | 7/2011 | Sato ...................... | H02M 7/487 |
| | | | 363/40 |

(Continued)

FOREIGN PATENT DOCUMENTS

| | | |
|---|---|---|
| JP | H07-213072 A | 8/1995 |
| JP | 6771693 B1 | 10/2020 |

OTHER PUBLICATIONS

International Search Report and Written Opinion mailed on Oct. 12, 2021, received for PCT Application PCT/JP2021/029063, filed on Aug. 5, 2021, 8 pages including English Translation.

*Primary Examiner* — Alex Torres-Rivera
(74) *Attorney, Agent, or Firm* — XSENSUS LLP

(57) ABSTRACT

A power conversion device according to the present disclosure includes: a DC/DC conversion unit including positive and negative legs composed of semiconductor switching elements connected in series, an output filter having magnetic energy storage elements connected to output ends of the legs and first and second electric energy storage elements connected in series and having a neutral point, first and second current detection units, and a voltage detection unit; and a control unit composed of a single output voltage control unit which outputs a current command value, and first and second current control units which generate gate signals on the basis of the current command value and detection current values, to control ON/OFF operations of the semiconductor switching elements, independently of each other.

18 Claims, 12 Drawing Sheets

(51) Int. Cl.
  *H02M 1/12* (2006.01)
  *H02M 7/219* (2006.01)
(58) Field of Classification Search
  CPC ............. H02M 1/4216; H02M 1/4225; H02M
  1/4233; H02M 1/4241
  See application file for complete search history.

(56) References Cited

U.S. PATENT DOCUMENTS

2019/0123661 A1\* 4/2019 Iyasu .................. H02M 1/0085
2022/0255419 A1  8/2022 Tsuruta et al.

\* cited by examiner

301 AVR v_ref →
v_sens → i_ref

302 ACR1 i_sens1 → ma

Figure 3:
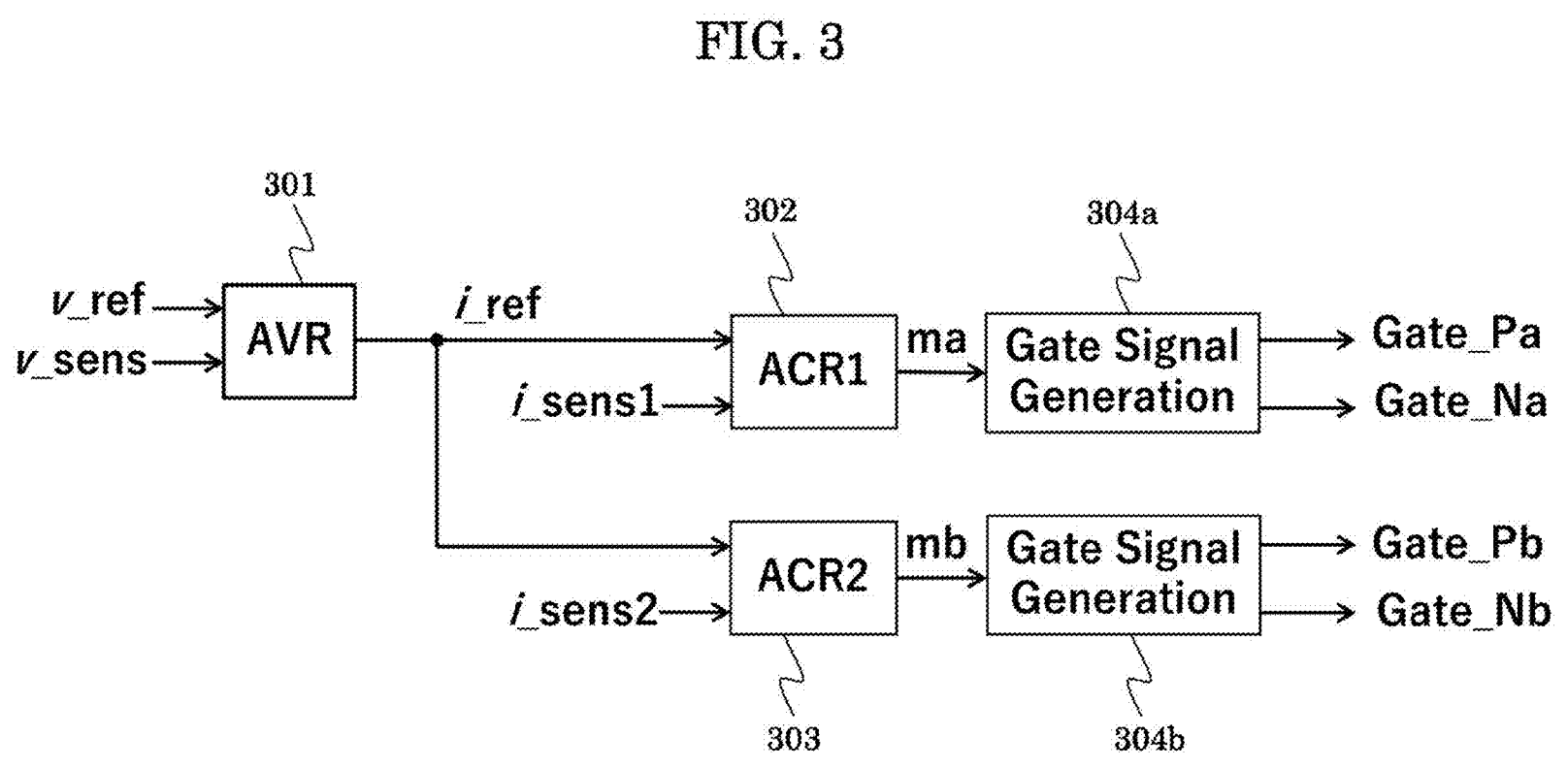

304a Gate Signal Generation → Gate_Pa → Gate_Na

303 ACR2 i_sens2 → mb

304b Gate Signal Generation → Gate_Pb → Gate_Nb

FIG. 6

TIME

FIG. 10

POWER CONVERSION DEVICE

CROSS-REFERENCE TO RELATED APPLICATION

This application is a national stage application, pursuant to 35 U.S.C. § 371, of International Patent Application No. PCT/JP2021/029063, filed Aug. 5, 2021, the entire contents of which are incorporated herein by reference.

TECHNICAL FIELD

The present disclosure relates to a power conversion device.

BACKGROUND ART

Various power conversion devices serving as a DC/DC converter that steps down inputted DC voltage so as to be converted to desired DC voltage have been proposed. Such a DC/DC converter has a pair of two positive and negative terminals as DC output terminals. One example of general circuit configurations of the DC/DC converter is a half-bridge circuit having an output terminal configuration in which the potentials of the output terminals with respect to a reference potential are asymmetric between positive and negative. There is also a full-bridge circuit having an output terminal configuration in which the potentials of the output terminals with respect to a reference are symmetric between positive and negative, but many of such full-bridge circuits correspond to power conversion devices for AC output (for example, Patent Document 1).

CITATION LIST

Patent Document

Patent Document 1: Japanese Laid-Open Patent Publication No. 7-213072
Patent Document 2: Japanese Patent No. 6771693

SUMMARY OF THE INVENTION

Problem to be Solved by the Invention

In the half-bridge circuit, since the potentials of the positive and negative output terminals with respect to the reference potential are asymmetric, for example, in a case of supplying power to a DC load in DC power distribution, when the reference potential is additionally set as a ground potential, it is necessary to take measures separately in view of prevention of failure or erroneous operation of the DC load. As a result, the number of components increases, leading to a problem that the power conversion device is complicated.

On the other hand, the full-bridge circuit in which the potentials of the output terminals with respect to the ground potential are symmetric between positive and negative is generally intended for AC output voltage. One example of a case where the full-bridge circuit is used for DC output voltage is a power conversion device disclosed in Patent Document 2. However, Patent Document 2 has no description about a method for suppressing resonant current in such a case of having a path through which resonant current flows to a passive filter in a DC/DC converter. In a case of having a path through which common mode current flows in a DC/DC converter for the purpose of stabilizing potentials with respect to the ground, unintended resonant current might flow, so that output voltage oscillates. Thus, there is room for improvement.

The present disclosure has been made to solve the above problem, and an object of the present disclosure is to provide a power conversion device that can supply stabilized DC voltage by suppressing common mode current flowing out to a connected load or the like.

Means to Solve the Problem

A power conversion device according to the present disclosure includes: a DC/DC conversion unit which converts DC voltage inputted from a DC power supply, to desired DC voltage; and a control unit which controls the DC/DC conversion unit. The DC/DC conversion unit includes: a positive leg composed of a first semiconductor switching element and a second semiconductor switching element connected in series between a positive side and a negative side of the DC power supply; a negative leg composed of a third semiconductor switching element and a fourth semiconductor switching element connected in series, the negative leg being connected in parallel to the positive leg; an output filter composed of a first magnetic energy storage element on a positive side connected to an output end of the positive leg, a second magnetic energy storage element on a negative side connected to an output end of the negative leg, and a first electric energy storage element and a second electric energy storage element connected in series between the positive side and the negative side, the output filter having a neutral point which is a connection part between the first electric energy storage element and the second electric energy storage element; a first current detection unit for detecting current flowing through the output end of the positive leg, and a second current detection unit for detecting current flowing through the output end of the negative leg; and a voltage detection unit for detecting voltage between the positive side and the negative side. The control unit includes: a single output voltage control unit which outputs a current command value on the basis of a detection voltage value outputted from the voltage detection unit and an output voltage command value for output voltage, inputted to the control unit; and a first current control unit and a second current control unit which respectively generate gate signals for controlling the positive leg and the negative leg, on the basis of the current command value and respective detection current values outputted from the first current detection unit and the second current detection unit, to control ON/OFF operations of the first semiconductor switching element and the second semiconductor switching element composing the positive leg, and ON/OFF operations of the third semiconductor switching element and the fourth semiconductor switching element composing the negative leg, independently of each other.

Effect of the Invention

In the power conversion device according to the present disclosure, the control unit which controls the DC/DC conversion unit includes a single output voltage control unit, and two current control units, i.e., the first current control unit and the second current control unit, which can perform current control independently of each other, whereby it becomes possible to suppress common mode current due to resonance of the output filter of the DC/DC conversion unit.

Thus, an effect of obtaining a power conversion device that can supply stabilized DC voltage is provided.

BRIEF DESCRIPTION OF THE DRAWINGS

FIG. 1 is a circuit diagram showing a configuration example of a power conversion device according to embodiment 1.

FIG. 3 is a function block diagram showing a configuration example of a control unit in the power conversion device according to embodiment 1.

FIG. 6 is a function block diagram showing a configuration example of a current control unit in the control unit of the power conversion device according to embodiment 1.

FIG. 10 is a circuit diagram showing a configuration example of a power conversion device according to embodiment 2.

DESCRIPTION OF EMBODIMENTS

Embodiment 1

Figure 1:
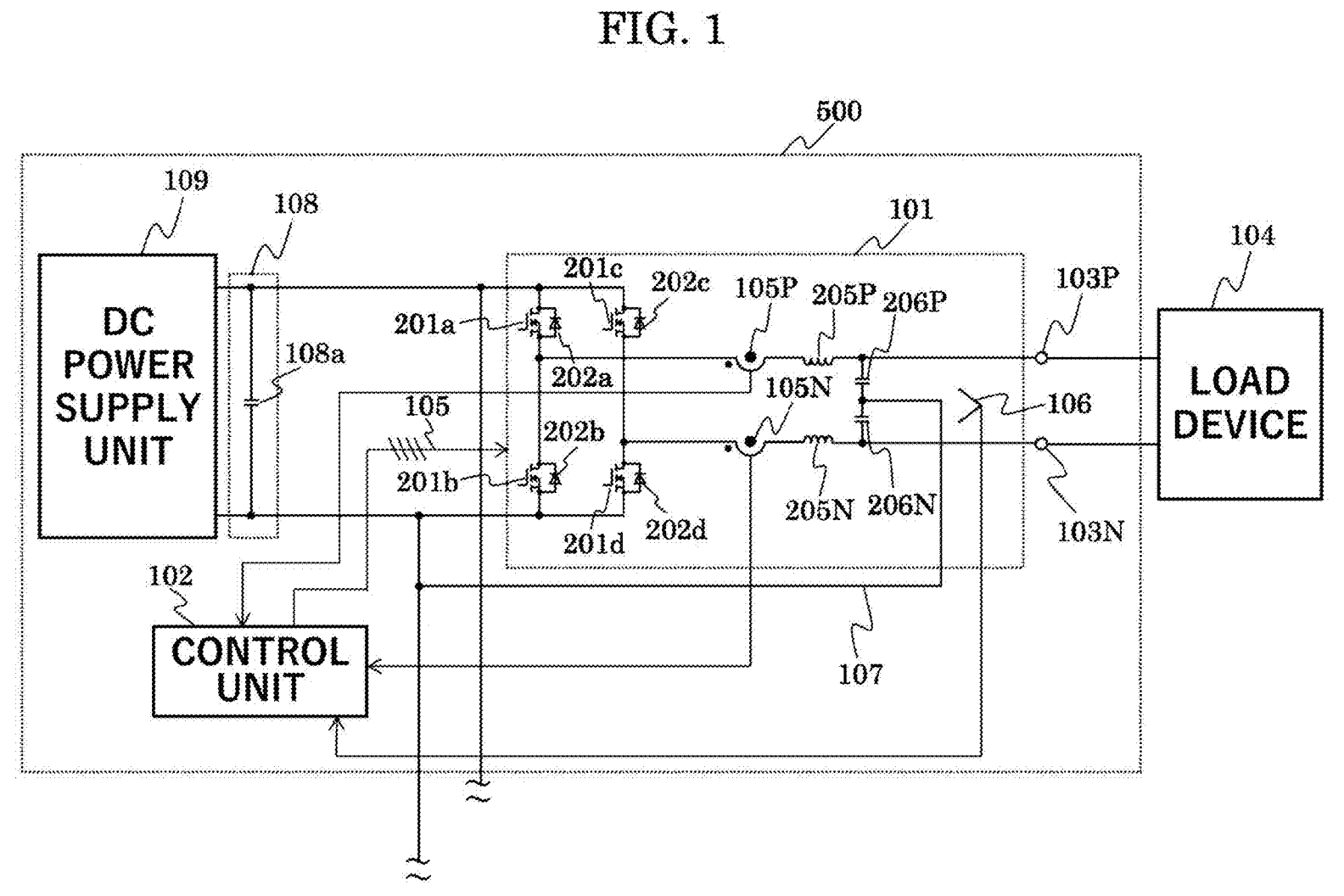
Figure 2:
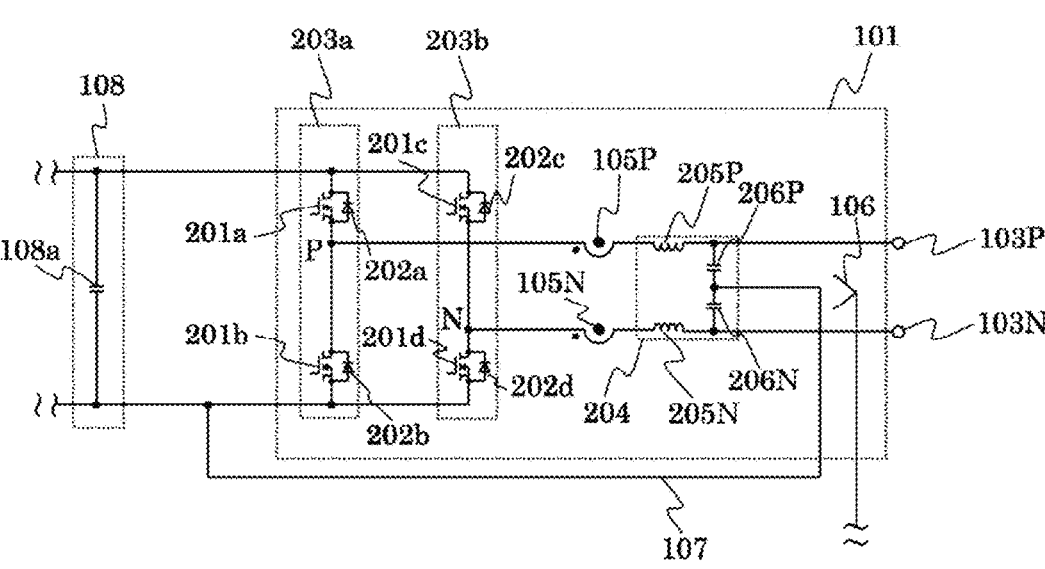
FIG. 2 is a circuit diagram showing a configuration example of a DC/DC conversion unit in the power conversion device according to embodiment 1.

FIG. 1 is a circuit diagram showing a configuration example of a power conversion device according to embodiment 1.

A power conversion device 500 according to embodiment 1 functions as a DC/DC converter that steps down inputted DC voltage and outputs desired DC power.

Main components of the power conversion device 500 are a DC/DC conversion unit 101 which performs DC/DC conversion, and a control unit 102 which controls ON/OFF operations of a first semiconductor switching element 201a, a second semiconductor switching element 201b, a third semiconductor switching element 201c, and a fourth semiconductor switching element 201d which compose the DC/DC conversion unit 101. Among output terminals of the power conversion device 500, a positive terminal 103P and a negative terminal 103N are connected to a load device 104 which receives DC voltage, for example.

For controlling desired DC voltage or DC power in the DC/DC conversion unit 101, a first current detection unit 105P located on the side connected to the positive terminal 103P and a second current detection unit 105N located on the side connected to the negative terminal 103N are provided per one DC/DC conversion unit 101. In addition, one voltage detection unit 106 is provided to be connected between the positive terminal 103P and the negative terminal 103N.

The DC/DC conversion unit 101 has, in addition to the positive terminal 103P and the negative terminal 103N, a neutral point line 107 having a potential therebetween and connected to a circuit part on the input side as appropriate.

The DC/DC conversion unit 101 according to embodiment 1 is not particularly specified regarding a power flow between the load device 104 connected to the output side and a DC power supply unit 109 connected via a DC link section 108 provided on the input side.

As the load device 104, a DC load that receives and consumes DC power or, for example, a storage battery that can be charged with DC power and can discharge the power as appropriate, may be applied, whereby power can be transferred to/from the DC power supply unit 109 connected via the DC link section 108. A specific example of the storage battery is a lithium ion battery.

The DC/DC conversion unit 101 shown in FIG. 1 is a single unit, but the power conversion device 500 according to embodiment 1 is assumed to be a power distribution system having a plurality of different DC power distribution grids, and thus can include two or more DC/DC conversion units via the DC link section 108. In this case, the device configurations thereof are the same but voltages to be outputted can be set as desired.

FIG. 2 is a circuit diagram showing a configuration example of the DC/DC conversion unit in the power conversion device 500 according to embodiment 1. The detailed configuration of a full-bridge chopper which is the DC/DC conversion unit 101 of the power conversion device 500 according to embodiment 1, and connection of the neutral point line 107, will be described with reference to FIG. 2. The DC/DC conversion unit 101 includes, as components thereof, the first semiconductor switching element 201a and the second semiconductor switching element 201b connected in series, the third semiconductor switching element 201c and the fourth semiconductor switching element 201d connected in series, and flyback diodes 202a, 202b, 202c, 202d respectively connected in antiparallel to the first to fourth semiconductor switching elements 201a, 201b, 201c, 201d.

A positive leg 203a is formed by the first semiconductor switching element 201a and the second semiconductor switching element 201b connected in series, and a negative leg 203b is formed by the third semiconductor switching element 201c and the fourth semiconductor switching element 201d connected in series.

In the positive leg 203a, a connection part between the first semiconductor switching element 201a and the second semiconductor switching element 201b connected in series, i.e., a neutral point, is connected to a positive point P. This neutral point may be referred to as an output end of the positive leg 203a.

In the negative leg 203b, a connection part between the third semiconductor switching element 201c and the fourth semiconductor switching element 201d connected in series, i.e., a neutral point, is connected to a negative point N. This neutral point may be referred to as an output end of the negative leg 203b.

To the positive point P which is the output end of the positive leg 203a, the first current detection unit 105P for detecting the value of current flowing through the positive point P is connected. To the negative point N which is the output end of the negative leg 203$b$, the second current detection unit 105N for detecting the value of current flowing through the negative point N is connected. The current detection values detected by the first current detection unit 105P and the second current detection unit 105N are outputted to the control unit 102. In addition, the voltage detection unit 106 is provided for detecting voltage between the positive point P and the negative point N.

An output filter 204 is connected to the first current detection unit 105P and the second current detection unit 105N. The output filter 204 includes a first filter reactor 205P on the positive point P side and a second filter reactor 205N on the negative point N side which are inductance components, and a first filter capacitor 206P and a second filter capacitor 206N which are capacitance components and are connected in series between the first filter reactor 205P and the second filter reactor 205N.

The filter reactor is an example of a magnetic energy storage element. The first filter reactor 205P may be referred to as a first magnetic energy storage element, and the second filter reactor 205N may be referred to as a second magnetic energy storage element.

The filter capacitor is an example of an electric energy storage element. The first filter capacitor 206P may be referred to as a first electric energy storage element, and the second filter capacitor 206N may be referred to as a second electric energy storage element.

The positive side of the output filter 204 is connected to the positive terminal 103P and the negative side of the output filter 204 is connected to the negative terminal 103N. The positive terminal 103P and the negative terminal 103N are connected to the load device 104 or the like at the outside.

One end of the neutral point line 107 is connected to a connection part between the first filter capacitor 206P and the second filter capacitor 206N, i.e., a neutral point (hereinafter, referred to as a DC filter capacitor section neutral point). Another end of the neutral point line 107 is connected to the negative side or the positive side of the DC link section 108 provided on the input side of the DC/DC conversion unit 101.

The DC link section 108 is connected between the DC power supply unit 109 and the DC/DC conversion unit 101. The DC link section 108 is formed by a DC link capacitor 108$a$ having one end connected to the positive side and another end connected to the negative side, for example. The DC link capacitor 108$a$ may be referred to as a third electric energy storage element. The DC link section 108 removes a ripple component superimposed on DC voltage outputted from the DC power supply unit 109.

FIG. 3 is a function block diagram showing an example of the configuration of the control unit 102 which controls the DC/DC conversion unit 101 which is a full-bridge chopper, according to embodiment 1. As an example of required operation, the DC/DC conversion unit 101 is operated so that voltage between the positive terminal 103P and the negative terminal 103N which are the output terminals has a voltage value set at desired DC voltage, and thus power is controlled between the input and the output.

Therefore, the control unit 102 in the power conversion device 500 according to embodiment 1 includes an output voltage control unit 301 (automatic voltage regulator (AVR)) as a host control unit. The output voltage control unit 301 controls DC voltage between the output terminals on the basis of a provided output voltage command value v_ref and a detection voltage value v_sens detected by the voltage detection unit 106.

Here, the control target is the DC voltage between the output terminals, which is a single target, and the output voltage control unit 301 is also single. In this case, the output voltage control unit 301 may be configured to perform general proportional control or proportional integral control. The output voltage control unit 301 performs control so that a deviation between the output voltage command value v_ref and the voltage detection value v_sens becomes zero, and outputs a current command value i_ref.

Further, the control unit 102 includes, as a minor loop, a first current control unit 302 (automatic current regulator 1 (ACR1)) and a second current control unit 303 (ACR2). The first current control unit 302 and the second current control unit 303 control currents on the positive side and the negative side of the DC/DC conversion unit 101 independently of each other on the basis of the current command value i_ref calculated by the output voltage control unit 301, a current detection value i_sens1 detected by the first current detection unit 105P, and a current detection value i_sens2 detected by the second current detection unit 105N.

In the first current control unit 302 and the second current control unit 303, as necessary, the polarity of a current command value for either unit may be inverted to derive a current command value for the other, thus performing control. Outputs of the first current control unit 302 and the second current control unit 303 are provided as modulation signals ma, mb to a first gate signal generation unit 304$a$ (Gate Signal Generation) and a second gate signal generation unit 304$b$.

The first gate signal generation unit 304$a$ generates gate signals for the first semiconductor switching element 201$a$ and the second semiconductor switching element 201$b$ composing the positive leg 203$a$, so as to be converted to voltages for driving the first semiconductor switching element 201$a$ and the second semiconductor switching element 201$b$, thereby controlling ON/OFF operations of the semiconductor switching elements.

The second gate signal generation unit 304$b$ generates gate signals for the third semiconductor switching element 201$c$ and the fourth semiconductor switching element 201$d$ composing the negative leg 203$b$, so as to be converted to voltages for driving the third semiconductor switching element 201$c$ and the fourth semiconductor switching element 201$d$, thereby controlling ON/OFF operations of the semiconductor switching elements.

As described above, the first current control unit 302 and the second current control unit 303 are separated for the positive leg 203$a$ and the negative leg 203$b$, respectively. In the case where the control unit 102 has the configuration as shown in FIG. 3, among the first to fourth semiconductor switching elements 201$a$, 201$b$, 201$c$, 201$d$ shown in FIG. 2, gate signals Gate_Pa and Gate_Na correspond to the first semiconductor switching element 201$a$ and the second semiconductor switching element 201$b$ composing the positive leg 203$a$, and gate signals Gate_Pb and Gate_Nb correspond to the third semiconductor switching element 201$c$ and the fourth semiconductor switching element 201$d$ composing the negative leg 203$b$.

Figure 4:
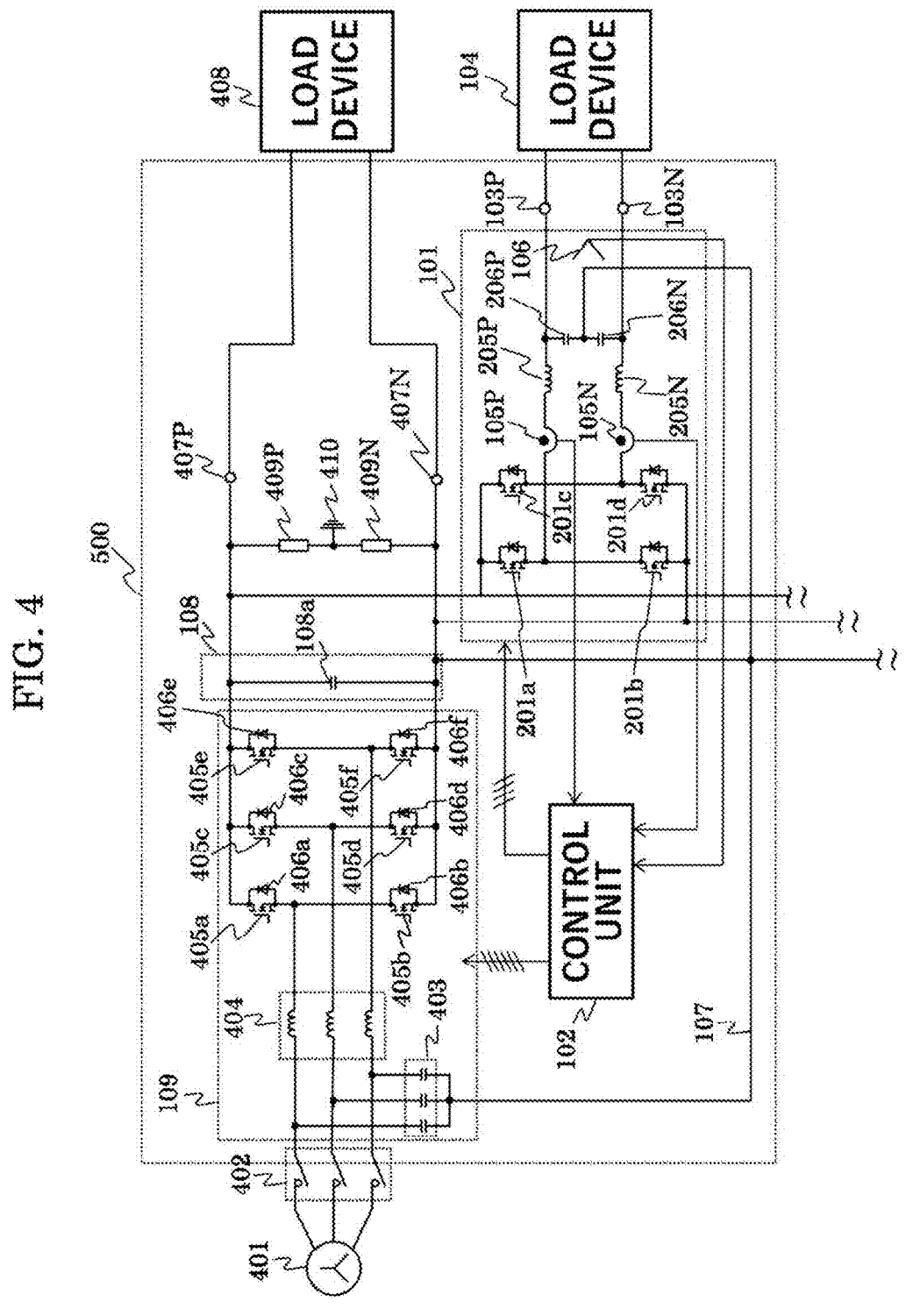
FIG. 4 is a circuit diagram showing a configuration example of the power conversion device according to embodiment 1.

As described above, with respect to the single output voltage control unit 301, two current control units, i.e., the first current control unit 302 and the second current control unit 303, which control currents independently of each other, are provided. The reason therefor will be described with reference to a circuit diagram in FIG. 4. FIG. 4 is a circuit diagram including a specific configuration inside the DC power supply unit 109 which supplies DC voltage to the DC/DC conversion unit 101.

The circuit configuration inside the DC power supply unit 109 in FIG. 4 is a general three-phase converter that converts power received from a three-phase AC voltage grid to DC voltage, and normally includes, as components, a commercial transformer 401, a grid relay section 402, an AC filter capacitor section 403, an AC filter reactor section 404, semiconductor switching elements 405*a*, 405*b*, 405*c*, 405*d*, 405*e*, 405*f* for the DC power supply unit 109, and flyback diodes 406*a*, 406*b*, 406*c*, 406*d*, 406*e*, 406*f* for the DC power supply unit 109.

The AC filter capacitor section 403 is formed such that three capacitors for respective phases of three-phase AC voltages are connected in a three-phase star-connection form. The three capacitors forming the AC filter capacitor section 403 are an example of an electric energy storage element. The neutral point line 107 is connected to a neutral point (hereinafter, referred to as an AC filter capacitor section neutral point) among the three capacitors.

The AC filter reactor section 404 includes three reactors connected for the respective phases of the three-phase AC voltages.

The DC voltage side which is the output side of the three-phase converter is connected to the DC link section 108. In this case, the control unit 102 used for control of the DC/DC conversion unit 101 can perform control of ON/OFF operations of the semiconductor switching elements in the DC power supply unit 109, at the same time.

In the circuit configuration shown in FIG. 4, in addition to the positive terminal 103P and the negative terminal 103N which are output terminals of the DC/DC conversion unit 101, a positive terminal 407P and a negative terminal 407N which are output terminals are further provided for the DC output of the DC power supply unit 109. Another load device 408 different from the load device 104 connected to the DC/DC conversion unit 101 can be connected to the positive terminal 407P and the negative terminal 407N.

That is, the power conversion device 500 according to embodiment 1 is characterized in that DC power outputted from the DC/DC conversion unit 101 and DC power outputted from the DC power supply unit 109 constitute DC output grids different from each other.

In the power conversion device 500 according to embodiment 1, since the circuit configuration as shown in FIG. 4 is adopted, it becomes possible to connect a load device also to a power distribution grid in which a path for supplying power to the load device does not pass through the DC/DC conversion unit 101, whereby efficiency in the entire power distribution system is improved.

As an example of a grounding method for the power conversion device 500 according to embodiment 1, connection to a ground potential 410 by a first ground resistor 409P and a second ground resistor 409N which are ground resistors is shown in FIG. 4. The first ground resistor 409P and the second ground resistor 409N are connected in series between the positive side and the negative side on the output side of the DC power supply unit 109. A connection part between the first ground resistor 409P and the second ground resistor 409N is grounded so as to have the ground potential 410.

That is, the power conversion device 500 according to embodiment 1 is characterized in that the connection part between the first ground resistor 409P and the second ground resistor 409N connected in series between the positive side and the negative side on the output side of the DC power supply unit 109 is grounded.

In the power distribution system that supplies DC voltage to the load device 104 or the load device 408 as shown in FIG. 4, the positive terminal 103P and the negative terminal 103N or the positive terminal 407P and the negative terminal 407N, which are output terminals of a power distribution section for DC voltage, are set such that their potentials with respect to the ground potential 410 (potentials with respect to the ground) are symmetric between positive and negative, and this is advantageous in terms of insulation designing.

Thus, by making connection to the ground potential 410 such that potentials are symmetric between positive and negative in the DC link section 108, even in a power distribution system including, for example, a plurality of DC/DC conversion units 101 in addition to the positive terminal 407P and the negative terminal 407N which are output terminals, potentials of any of the positive terminals 103P, 407P and the negative terminals 103N, 407N which are output terminals, with respect to the ground, can be made symmetric between positive and negative.

In addition, by making connection to the ground potential 410 via the first ground resistor 409P and the second ground resistor 409N, for example, even in a case where a ground fault has occurred at a part connected to the positive terminal 407P, current due to the ground fault flows on a path through the first ground resistor 409P, so that flow of excessive current can be prevented, thus providing an effect of improving reliability of the power conversion device 500.

Figure 5:
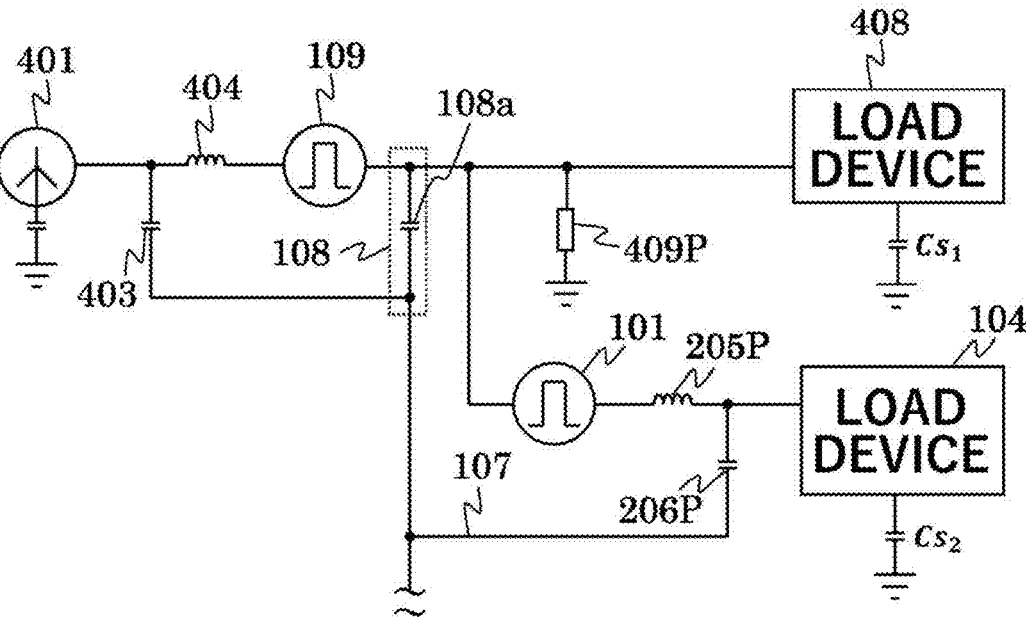
FIG. 5 is an equivalent circuit diagram showing a common mode current path in the power conversion device according to embodiment 1.

A path of common mode current which occurs in the case of the circuit configuration as shown in FIG. 4 is shown in an equivalent circuit diagram in FIG. 5. In a case where a main path of the common mode current includes a stray capacitance of the load device 104 or the commercial transformer 401, this can be a cause of failure or erroneous operation of a connected device. Therefore, it is necessary to suppress the common mode current.

The common mode current passing through the stray capacitance of the commercial transformer 401 or the load device 104 can be suppressed when the DC filter capacitor section neutral point of the first filter capacitor 206P and the second filter capacitor 206N and the AC filter capacitor section neutral point of the AC filter capacitor section 403, included in the power conversion device 500, are connected to each other. This is because the capacitances of the first filter capacitor 206P and the capacitors composing the AC filter capacitor section 403 are generally much greater than the stray capacitance and thus the impedance of the path on the neutral point line 107 becomes small.

Further, as shown in FIG. 4, in the case of the configuration in which the DC link section 108 is connected to the load device 408, the neutral point line 107 is not connected between the DC power supply unit 109 on the input side and the DC/DC conversion unit 101 on the output side, but the DC power supply unit 109 and the DC/DC conversion unit 101 need to be provided with paths through which common mode currents are circulated independently of each other in the power conversion device 500. Therefore, the negative side of the DC link section 108 and the AC filter capacitor section neutral point are connected. The positive side of the DC link section 108 and the AC filter capacitor section neutral point may be connected.

In the case where the neutral point line 107 as described above is present, for example, there is a possibility that resonant current due to resonance of the output filter 204 flows through the common mode path and thus the potential of the output terminal with respect to the ground or voltage between the output terminals fluctuates. Therefore, it is necessary to suppress resonant current caused by resonance of the output filter 204, i.e., a common mode component of output current. Here, resonant current in the common mode is referred to as a common mode component of output current, and a current component other than the common mode component in the output current is referred to as a normal mode component.

However, as in the power conversion device described in Patent Document 2, a general DC/DC converter has only one current detection unit for a pair of output terminals. This is because the output of a general DC/DC converter does not have a common mode path.

On the other hand, in the power conversion device 500 according to embodiment 1, in a case where resonant current flows through a common mode path, the first current detection unit 105P and the second current detection unit 105N are provided respectively for the two terminals on the output side, and the first current control unit 302 and the second current control unit 303 that can perform current control independently of each other are provided, whereby it is possible to effectively suppress resonant current in the common mode as described above.

That is, the first current control unit 302 and the second current control unit 303 which are components of the control unit 102 in the power conversion device 500 according to embodiment 1 are characterized to perform control such that a normal mode component and a common mode component of output current from the DC/DC conversion unit 101 are separated from each other.

The above description is about a path of resonant current in the single DC/DC conversion unit 101. Meanwhile, for example, in a case where a plurality of DC/DC conversion units 101 are connected in parallel, a path of resonant current is also formed between different DC/DC conversion units 101, but the resonant current can be suppressed in the same manner by the above circuit configuration. That is, it is possible to supply DC power using two or more DC/DC conversion units 101, from the power conversion device 500 to the same load device.

Figure 6:
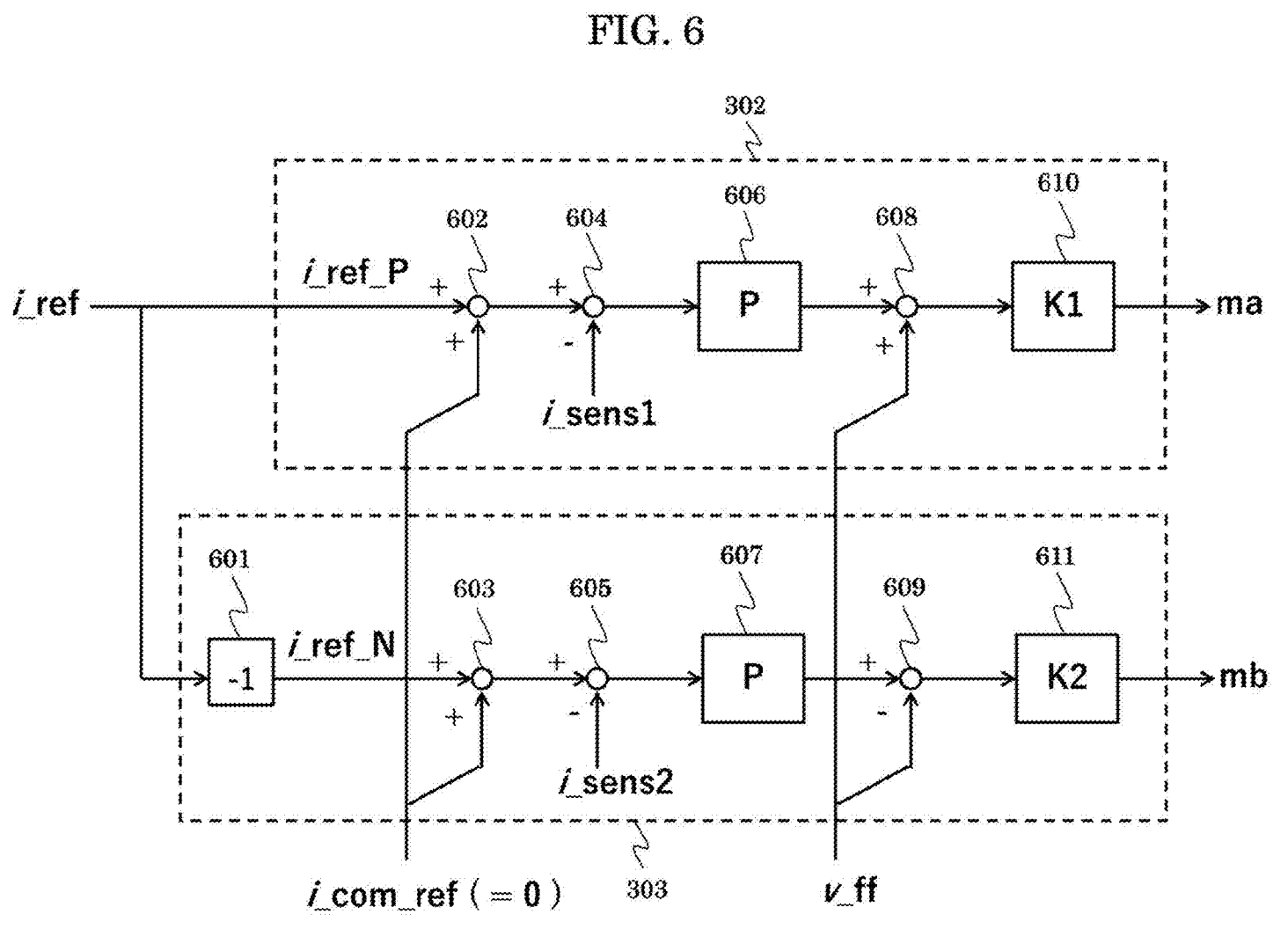

An example of the configuration of the first current control unit 302 and the second current control unit 303 which are components of the control unit 102 in the power conversion device 500 according to embodiment 1, is shown in a function block diagram in FIG. 6.

The first current control unit 302 includes a first adder 602, a first subtractor 604, a first gain multiplier 606, a third adder 608, and a first multiplier 610 in this order from the input side.

The second current control unit 303 includes a polarity inverter 601, a second adder 603, a second subtractor 605, a second gain multiplier 607, a third subtractor 609, and a second multiplier 611 in this order from the input side. The second current control unit 303 is different from the first current control unit 302 in that the polarity inverter 601 is provided on the input side.

The first current control unit 302 and the second current control unit 303 receive the same current command value i_ref. Then, the first current control unit 302 corresponding to the positive leg 203a uses i_ref as i_ref_P, and the second current control unit 303 corresponding to the negative leg 203b performs polarity inversion to produce-1*i_ref as i_ref_N, using the polarity inverter 601.

The above configuration is a configuration in a case where the current polarities of current detection values outputted from the first current detection unit 105P and the second current detection unit 105N which detect currents flowing from the positive leg 203a and the negative leg 203b are both defined such that directions toward the positive terminal 103P and the negative terminal 103N which are output terminals are positive.

Further, it is possible to control common mode current by adding a common mode current command value i_com_ref using the first adder 602 and the second adder 603. However, it is basically preferable that the common mode current is zero in terms of output voltage control, and therefore i_com_ref is set at 0 in principle.

Next, in the first current control unit 302 and the second current control unit 303, respectively, deviations between the current command values and the current detection values are calculated using the first subtractor 604 and the second subtractor 605, and the deviations are multiplied by gains by the first gain multiplier 606 and the second gain multiplier 607. Further, a voltage feedforward term v_ff obtained on the basis of the voltage detection value detected by the voltage detection unit 106 is added by the third adder 608 in the first current control unit 302, and meanwhile, the voltage feedforward term v_ff is subtracted by the third subtractor 609 in the second current control unit 303.

Next, the resultant values are normalized to be in appropriate value ranges by the first multiplier 610 and the second multiplier 611, thus calculating ma and mb which are modulation signals to be used for the first gate signal generation unit 304a and the second gate signal generation unit 304b to generate pulses. Multiplication values in the first multiplier 610 and the second multiplier 611 may be a reciprocal of detected voltage of the DC link section 108, or the like.

Figure 7:
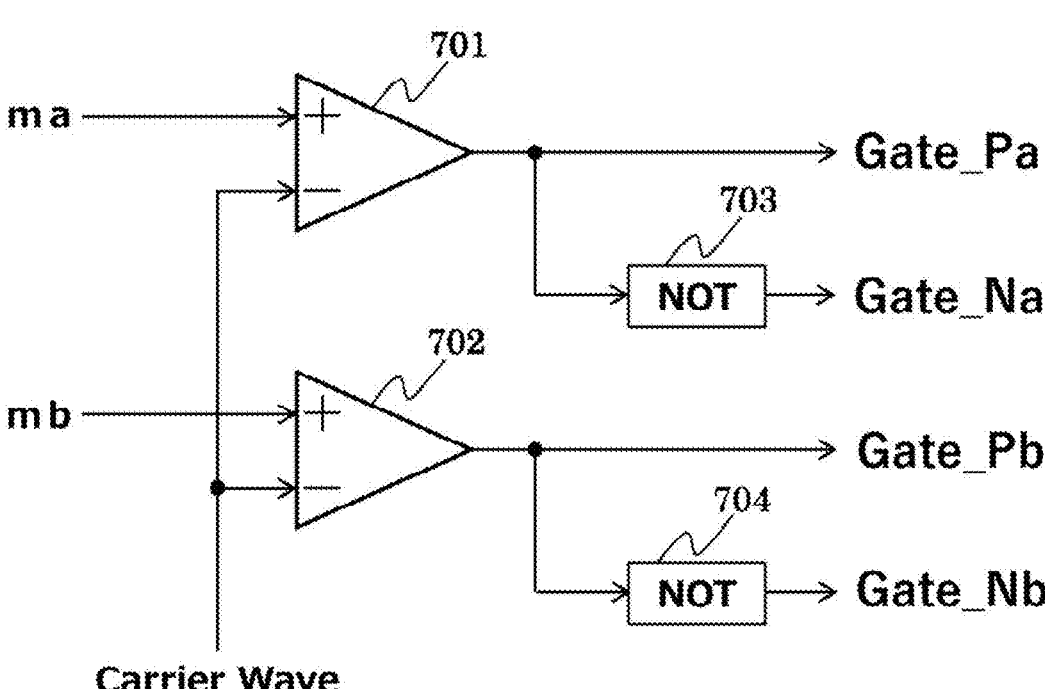
FIG. 7 is a circuit diagram showing a configuration example of gate signal generation units in the control unit of the power conversion device according to embodiment 1.

FIG. 7 shows a circuit configuration example of the first gate signal generation unit 304a and the second gate signal generation unit 304b in the control unit 102 in the power conversion device 500 according to embodiment 1. The circuit configuration shown in FIG. 7 corresponds to a method called pulse width modulation (PWM) using a carrier wave formed by a triangular wave, in general. The modulation signals ma, mb calculated by the first current control unit 302 and the second current control unit 303 described above and the carrier wave formed by a triangular wave are compared with each other in magnitude by a first comparator 701 and a second comparator 702, to generate pulses. The first comparator 701 and the second comparator 702 are logic circuits, and output 1 when the inputted modulation signals ma, mb are greater than the carrier wave formed by a triangular wave, and output 0 when the inputted modulation signals ma, mb are smaller than the carrier wave formed by a triangular wave.

Further, signals inverted from the outputs of the first comparator 701 and the second comparator 702 are generated using a first inversion circuit 703 and a second inversion circuit 704, thus obtaining signals for controlling ON/OFF operations of the first to fourth semiconductor switching elements 201a, 201b, 201c, 201d forming the full-bridge chopper as in the DC/DC conversion unit 101.

Since the first inversion circuit 703 and the second inversion circuit 704 are used in the first gate signal generation unit 304a and the second gate signal generation unit 304b, the first semiconductor switching element 201a and the second semiconductor switching element 201b, and the third semiconductor switching element 201c and the fourth semiconductor switching element 201d, which are connected in series in the respective same legs, ideally operate such that, when one semiconductor switching element is ON, the other semiconductor switching element is OFF. However, in actual use, a dead time may be provided in order to prevent the semiconductor switching elements from being turned on at the same time due to element characteristic variations in the semiconductor switching elements or the like.

Figure 8:
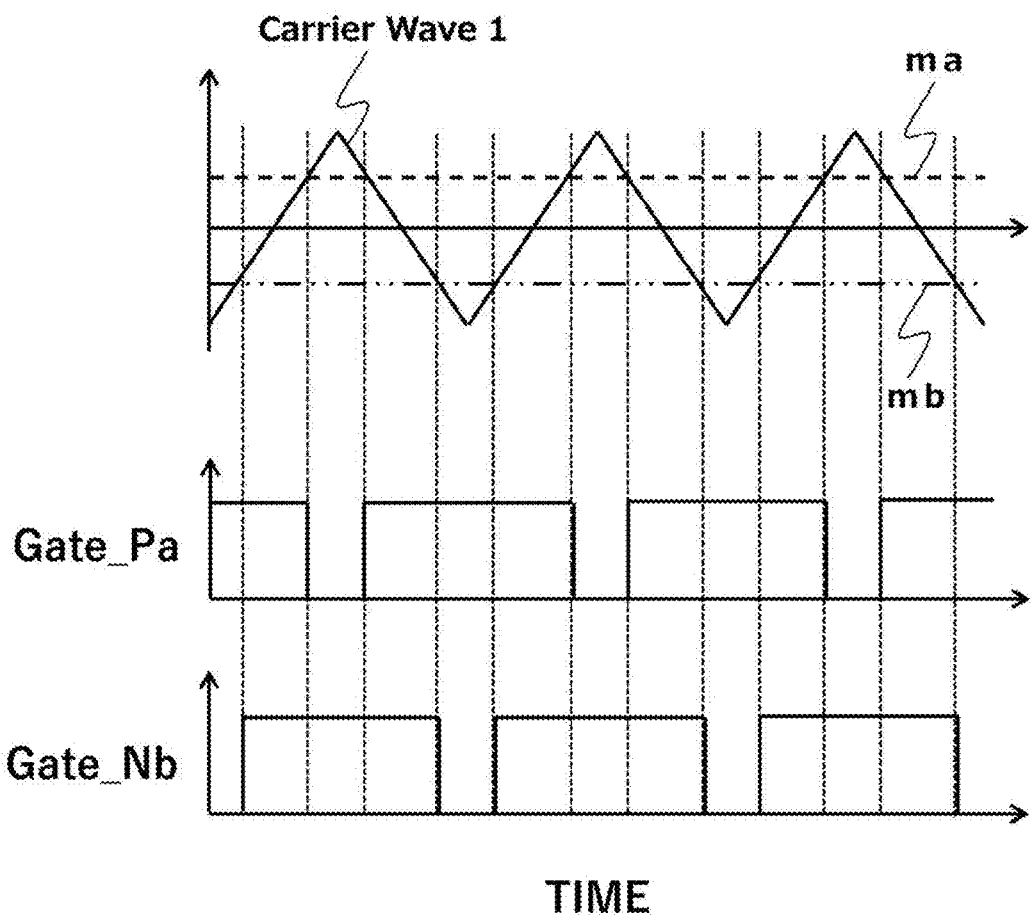
FIG. 8 shows schematic waveforms for illustrating operations of the gate signal generation units in the control unit of the power conversion device according to embodiment 1.
Figure 9:
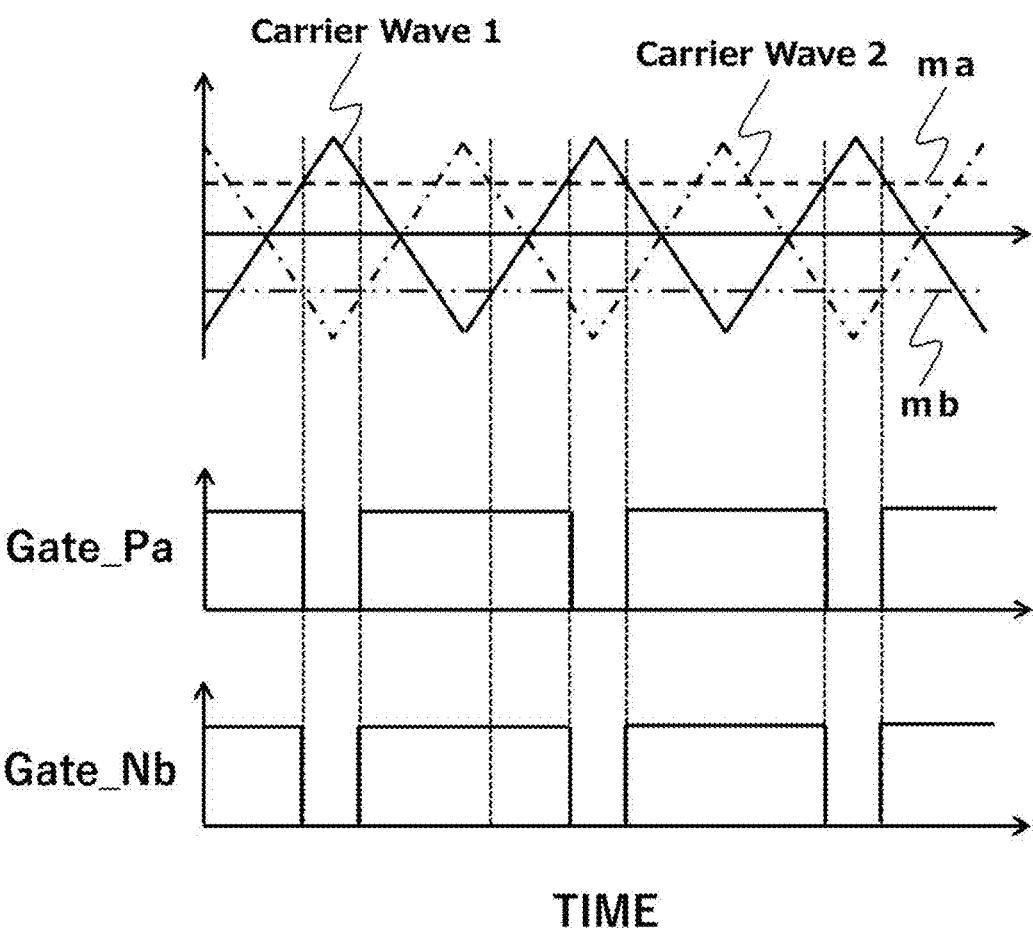
FIG. 9 shows schematic waveforms for illustrating operations of the gate signal generation units in the control unit of the power conversion device according to embodiment 1.

FIG. 8 and FIG. 9 show comparison of gate signals in a case where the carrier wave formed by a triangular wave, used in PWM, is a single wave (FIG. 8) and in a case of using carrier waves formed by two triangular waves with phases shifted from each other by 180 degrees (FIG. 9). Ideally, the modulation signals ma and mb are two values having equal absolute values and different signs.

That is, the power conversion device 500 according to embodiment 1 is characterized in that the modulation signals ma and mb respectively calculated by the first current control unit 302 and the second current control unit 303 in the control unit 102 are two values having equal absolute values and different polarities.

As shown in FIG. 9, where the carrier wave formed by a triangular wave used in modulation for the positive leg 203*a* is Carrier wave 1 and the carrier wave formed by a triangular wave used in modulation for the negative leg 203*b* is Carrier wave 2, timings of the gate signals for the first semiconductor switching element 201*a* corresponding to Gate_Pa and the fourth semiconductor switching element 201*d* located at a diagonal position and corresponding to Gate_Nb are equal to each other.

The semiconductor switching elements are caused to perform switching operations at the timings as shown in FIG. 9, whereby common mode voltages outputted from the positive leg 203*a* and the negative leg 203*b* are canceled out with each other. Thus, it is possible to reduce common mode current due to switching operations.

That is, the power conversion device 500 according to embodiment 1 is characterized in that the control unit 102 controls ON/OFF operations of the semiconductor switching elements on the basis of comparison between the carrier wave and each of the modulation signals ma and mb respectively calculated by the first current control unit 302 and the second current control unit 303.

In addition, the power conversion device 500 according to embodiment 1 is characterized in that the control unit 102 controls ON/OFF operations of the semiconductor switching elements such that, with respect to the modulation signals ma and mb respectively calculated by the first current control unit 302 and the second current control unit 303, the phases of the carrier waves to be compared with the respective modulation signals ma and mb are shifted from each other by a half cycle.

In the above description, the control method until gate signal generation through PWM has been described. However, a current control method such as hysteresis control in which switching patterns of the semiconductor switching elements are determined so that a current value is kept within a predetermined band width, for example, may be applied.

As described above, in the power conversion device according to embodiment 1, in a case of having a path through which common mode current due to resonance of the output filter of the DC/DC conversion unit flows, the control unit including a single output voltage control unit and two current control units that can perform current control independently of each other is provided, whereby it is possible to suppress common mode current due to resonance of the output filter, thus providing an effect that voltages of output terminals can be controlled to be DC voltages corresponding to the current command value and symmetric between positive and negative with respect to the ground potential.

Embodiment 2

Figure 10:
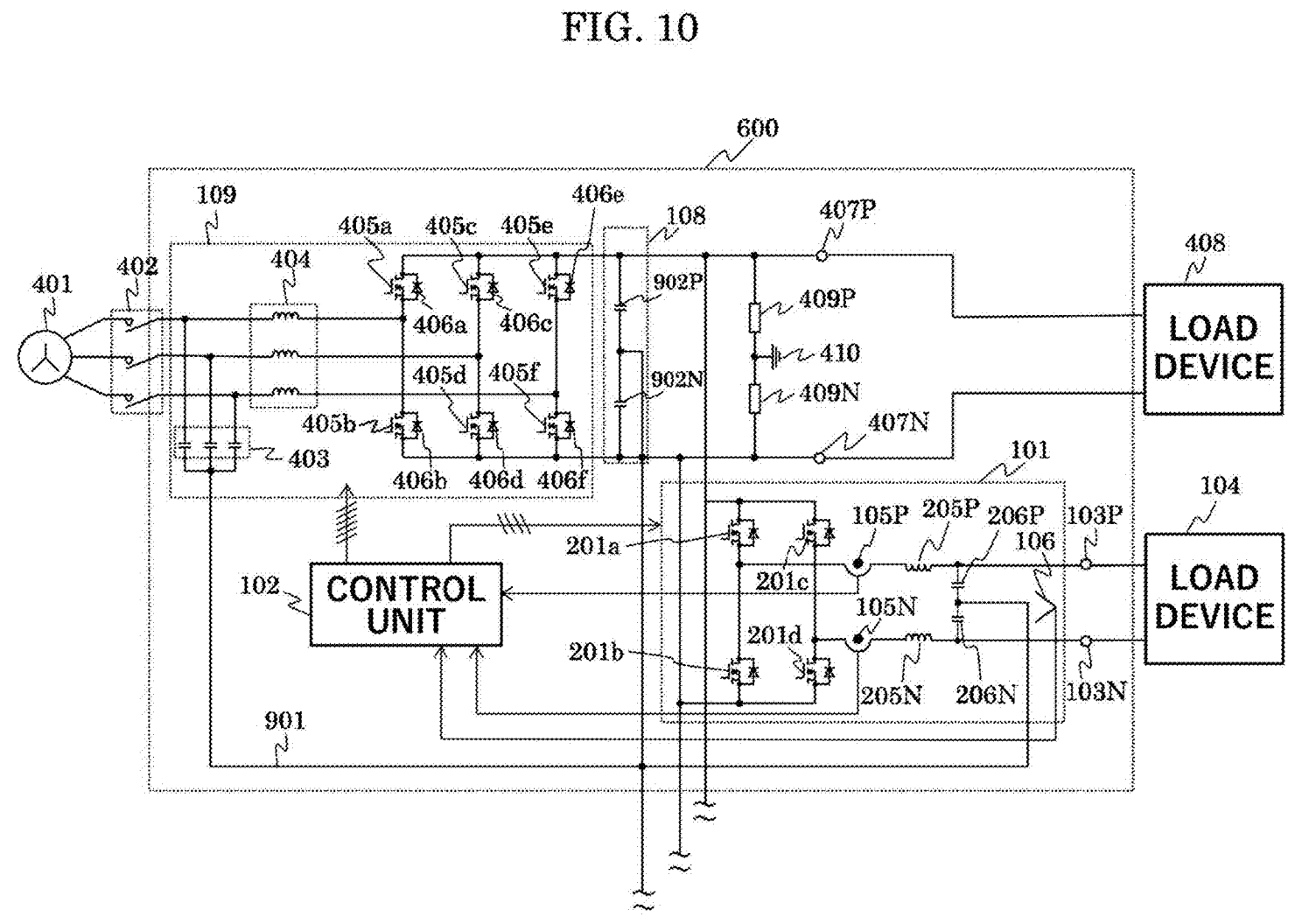

FIG. 10 shows the main circuit configuration of a power conversion device 600 according to embodiment 2. The basic configuration of the power conversion device 600 according to embodiment 2 is the same as the configuration of the power conversion device 500 according to embodiment 1. As a difference therebetween, a neutral point line 901 and the DC link section 108 are connected in a different manner.

In the power conversion device 600 according to embodiment 2, as shown in the circuit diagram in FIG. 10, a first DC link capacitor 902P and a second DC link capacitor 902N composing the DC link section 108 are connected in series. The first DC link capacitor 902P may be referred to as a third electric energy storage element, and the second DC link capacitor 902N may be referred to as a fourth electric energy storage element.

A DC link section neutral point which is a connection part between the first DC link capacitor 902P and the second DC link capacitor 902N, and a DC filter capacitor section neutral point which is a connection part between the first filter capacitor 206P and the second filter capacitor 206N connected in series between the positive side and the negative side in the DC/DC conversion unit 101, are connected via the neutral point line 901.

In the power conversion device 500 according to embodiment 1, voltages applied to the first filter capacitor 206P and the second filter capacitor 206N are not equal and therefore the first filter capacitor 206P and the second filter capacitor 206N are each required to have withstand voltage equal to voltage applied to the DC link section 108.

On the other hand, in the power conversion device 600 according to embodiment 2, the above-described circuit configuration is adopted, whereby it becomes possible to bear equal voltages in the first filter capacitor 206P and the second filter capacitor 206N, so that voltages applied to the filter capacitors are comparatively low, thus providing an effect that capacitors having lower withstand voltage can be used.

Embodiment 3

Figure 11:
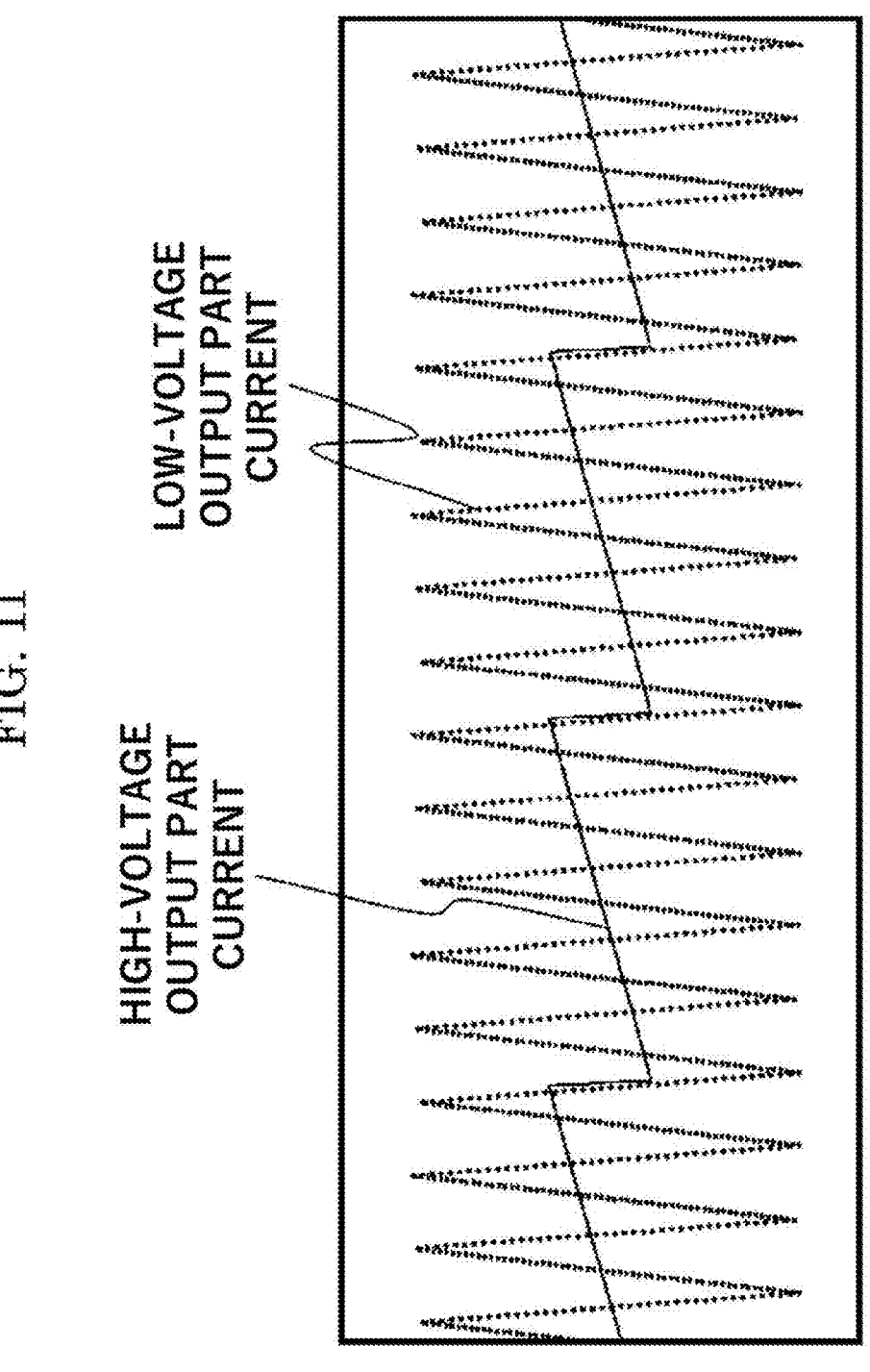
FIG. 11 shows a current waveform example in a DC/DC conversion unit in a power conversion device according to embodiment 3.

FIG. 11 shows an example of waveforms of currents flowing through the first filter reactor 205P and the second filter reactor 205N compared between a case where the voltage between the output terminals of the DC/DC conversion unit 101 is low (low-voltage output part current in FIG. 11) and a case where the voltage is high (high-voltage output part current in FIG. 11), in a power conversion device according to embodiment 3. In general, the output voltage of the full-bridge chopper is obtained by stepping down the voltage of the DC power supply unit 109 on the input side. However, if the aforementioned dead time is provided in switching operations of the semiconductor switching elements, the voltage that can be outputted might be limited.

The influence of the dead time increases in proportion to the number of times of switching, and therefore, as the number of times of switching increases, the influence on limitation of the output voltage increases. That is, if the number of times of switching is decreased, the influence of the dead time is reduced. Thus, the power conversion device according to embodiment 3 is operated so that the number of times of switching is decreased.

One of characteristics of operation of the DC/DC conversion unit 101 is that, as the output voltage increases, the ripple widths of currents in the first filter reactor 205P and the second filter reactor 205N are reduced. Therefore, in the power conversion device according to embodiment 3, even if the number of times of switching of the semiconductor switching elements is decreased at an operation point where the output voltage is high, it is possible to perform operation without increasing the current ripple width. That is, it becomes possible to reduce loss due to switching operations of the semiconductor switching elements or reduce the influence of the dead time on the output voltage, for example.

As described above, the power conversion device according to embodiment 3 is characterized in that the first current control unit 302 and the second current control unit 303 in the control unit 102 generate the gate signals for controlling the semiconductor switching elements so that the current ripple width becomes a predetermined value or smaller.

In addition, the power conversion device according to embodiment 3 is characterized in that the first current control unit 302 and the second current control unit 303 in the control unit 102 are operated so that, as the output voltage command value for the output voltage, inputted to the control unit 102, increases, the number of times of switching per unit time of each semiconductor switching element is decreased.

As a method for decreasing the number of times of switching in accordance with the output voltage as described above, for example, the frequency of the carrier wave formed by a triangular wave used in the first gate signal generation unit 304a and the second gate signal generation unit 304b, shown in FIG. 7, is set in a variable manner.

Also, in a case of applying hysteresis control in which ON/OFF operations of the semiconductor switching elements are controlled so that current is kept within a predetermined width with respect to a current command value, the width of current ripple is relatively reduced as the output voltage increases. Therefore, as a result, an effect of automatically decreasing the number of times of switching as the output voltage increases, is obtained.

Figure 12:
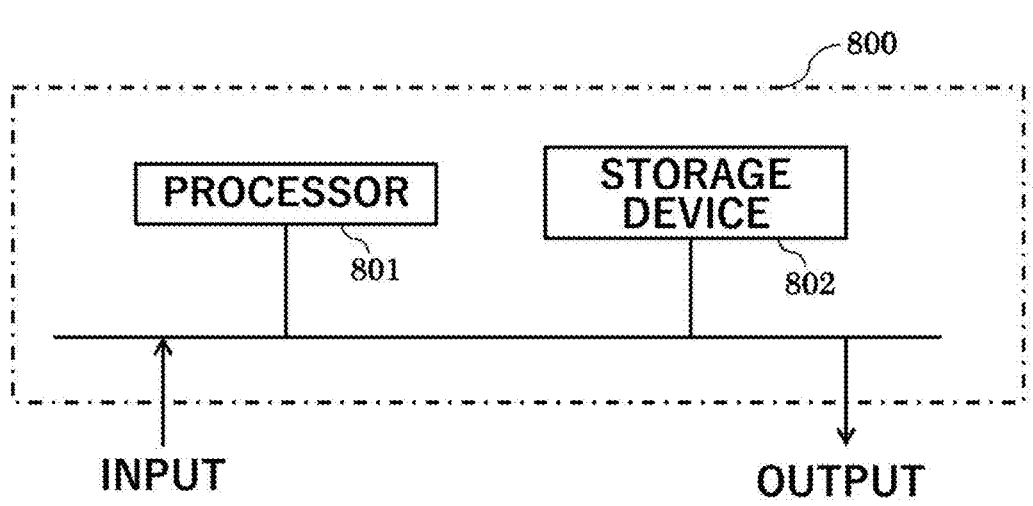
FIG. 12 is a function block diagram showing an example of hardware of the power conversion device according to each of embodiments 1 to 3.

In the configuration of the power conversion device in each of the above embodiments 1 to 3, the control unit 102 has mainly been described as function blocks. Meanwhile, FIG. 12 shows an example of a hardware configuration in which the control unit 102 is implemented. Hardware 800 is composed of a processor 801 and a storage device 802. Although not shown, the storage device is provided with a volatile storage device such as a random access memory and a nonvolatile auxiliary storage device such as a flash memory.

Instead of the flash memory, an auxiliary storage device of a hard disk may be provided. The processor 801 executes a program inputted from the storage device 802. In this case, the program is inputted from the auxiliary storage device to the processor 801 via the volatile storage device. The processor 801 may output data such as a calculation result to the volatile storage device of the storage device 802 or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

101 DC/DC conversion unit
102 control unit
103P, 407P positive terminal
103N, 407N negative terminal
104, 408 load device
105P first current detection unit
105N second current detection unit
106 voltage detection unit
107, 901 neutral point line
108 DC link section
108a DC link capacitor (third electric energy storage element)
109 DC power supply unit
201a first semiconductor switching element
201b second semiconductor switching element
201c third semiconductor switching element
201d fourth semiconductor switching element
202a, 202b, 202c, 202d, 406a, 406b, 406c, 406d, 406e, 406f flyback diode
203a positive leg
203b negative leg
204 output filter
205P first filter reactor (first magnetic energy storage element)
205N second filter reactor (second magnetic energy storage element)
206P first filter capacitor (first electric energy storage element)
206N second filter capacitor (second electric energy storage element)
301 output voltage control unit
302 first current control unit
303 second current control unit
304a, 304b gate signal generation unit
401 commercial transformer
402 grid relay section
403 AC filter capacitor section
404 AC filter reactor section
405a, 405b, 405c, 405d, 405e, 405f semiconductor switching element
409P first ground resistor
409N second ground resistor
410 ground potential
500, 600 power conversion device
601 polarity inverter
602 first adder
603 second adder
604 first subtractor
605 second subtractor
606 first gain multiplier
607 second gain multiplier
610 first multiplier
611 second multiplier
701 first comparator
702 second comparator
703 first inversion circuit
704 second inversion circuit
800 hardware
801 processor
802 storage device 902P first DC link capacitor (third electric energy storage element)

902N second DC link capacitor (fourth electric energy storage element)

P positive point

N negative point ma, mb modulation signal

The invention claimed is:

1. A power conversion device comprising:
a DC/DC converter which converts DC voltage inputted from a DC power supply, to desired DC voltage; and
a controller which controls the DC/DC converter, wherein the DC/DC converter includes
   a positive leg composed of a first semiconductor switching element and a second semiconductor switching element connected in series between a positive side and a negative side of the DC power supply,
   a negative leg composed of a third semiconductor switching element and a fourth semiconductor switching element connected in series, the negative leg being connected in parallel to the positive leg,
   an output filter composed of a first magnetic energy storage element on a positive side connected to an output end of the positive leg, a second magnetic energy storage element on a negative side connected to an output end of the negative leg, and a first electric energy storage element and a second electric energy storage element connected in series between the positive side and the negative side, the output filter having a neutral point which is a connection part between the first electric energy storage element and the second electric energy storage element,
   a first current detector for detecting current flowing through the output end of the positive leg, and a second current detector for detecting current flowing through the output end of the negative leg, and
   a voltage detector for detecting voltage between the positive side and the negative side, and
   the controller includes a single output voltage controller which outputs a current command value on the a basis of a detection voltage value outputted from the voltage detector and an output voltage command value for output voltage, and
   a first current controller and a second current controller which respectively generate gate signals for controlling the positive leg and the negative leg, on the a basis of the current command value and respective detection current values outputted from the first current detector and the second current detector, to control ON/OFF operations of the first semiconductor switching element and the second semiconductor switching element composing the positive leg, and ON/OFF operations of the third semiconductor switching element and the fourth semiconductor switching element composing the negative leg, independently of each other.

2. The power conversion device according to claim 1, further comprising, the DC power supply which converts AC voltage inputted from an AC power supply, to DC voltage, and outputs the DC voltage to the converter.

3. The power conversion device according to claim 2, wherein
DC power outputted from the DC/DC converter and DC power outputted from the DC power supply constitute DC output grids different from each other.

4. The power conversion device according to claim 2, further comprising, on an input side of the DC/DC converter, a DC link section composed of a third electric energy storage element, wherein
   the neutral point which is the connection part between the first electric energy storage element and the second electric energy storage element in the DC/DC converter is electrically connected to a positive side or a negative side of the DC link section.

5. The power conversion device according to claim 4, wherein
   a connection part between a first ground resistor and a second ground resistor connected in series between a positive side and a negative side on an output side of the DC power supply is grounded.

6. The power conversion device according to claim 2, further comprising a DC link section composed of a third electric energy storage element and a fourth electric energy storage element connected in series between a positive side and a negative side on an input side of the DC/DC converter, wherein
   the neutral point which is the connection part between the first electric energy storage element and the second electric energy storage element connected in series between the positive side and the negative side on an output side of the DC/DC converter is electrically connected to a DC link section neutral point which is a connection part between the third electric energy storage element and the fourth electric energy storage element in the DC link section.

7. The power conversion device according to claim 2, wherein
   modulation signals calculated by the first current controller and the second current controller are two values having equal absolute values and different polarities.

8. The power conversion device according to claim 2, wherein
   the first current controller and the second current controller each perform control such that a normal mode component and a common mode component of output current from the DC/DC converter are separated from each other.

9. The power conversion device according to claim 2, wherein
   the controller controls the ON/OFF operations of the semiconductor switching elements on the a basis of comparison between a carrier wave and each of modulation signals respectively calculated by the first current controller and the second current controller.

10. The power conversion device according to claim 2, wherein
   the controller controls the ON/OFF operations of the semiconductor switching elements such that, with respect to modulation signals respectively calculated by the first current controller and the second current controller, phases of carrier waves to be compared with the respective modulation signals are shifted from each other by a half cycle.

11. The power conversion device according to claim 2, wherein
   the first current controller and the second current controller generate the gate signals for controlling the semiconductor switching elements so that a current ripple width becomes a predetermined value or smaller.

12. The power conversion device according to claim 2, wherein the first current controller and the second controller are operated so that, as the output voltage command value increases, a number of times of switching per unit time of each semiconductor switching element is decreased.

13. The power conversion device according to claim 1, wherein modulation signals calculated by the first current controller and the second current controller are two values having equal absolute values and different polarities.

14. The power conversion device according to claim 1, wherein the first current controller and the second current controller each perform control such that a normal mode component and a common mode component of output current from the DC/DC converter are separated from each other.

15. The power conversion device according to claim 1, wherein the controller controls the ON/OFF operations of the semiconductor switching elements on a basis of comparison between a carrier wave and each of modulation signals respectively calculated by the first current controller and the second current controller.

16. The power conversion device according to claim 1, wherein the controller controls the ON/OFF operations of the semiconductor switching elements such that, with respect to modulation signals respectively calculated by the first current controller and the second current controller, phases of carrier waves to be compared with the respective modulation signals are shifted from each other by a half cycle.

17. The power conversion device according to claim 1, wherein the first current controller and the second current controller generate the gate signals for controlling the semiconductor switching elements so that a current ripple width becomes a predetermined value or smaller.

18. The power conversion device according to claim 1, wherein the first current controller and the second current controller are operated so that, as the output voltage command value increases, a number of times of switching per unit time of each semiconductor switching element is decreased.

* * * * *